(12) United States Patent
Qin et al.

(10) Patent No.: US 8,274,189 B2
(45) Date of Patent: Sep. 25, 2012

(54) MOTOR AND WINDOW LIFT

(75) Inventors: Rui Feng Qin, Hong Kong (CN); Ji Yu Liang, Shenzhen (CN); Di Wang, Shenzhen (CN); Yuan Jiang, Shenzhen (CN); Cheng Shun Du, Shenzhen (CN)

(73) Assignee: Johnson Electric S.A., Murten (CH)

( * ) Notice: Subject to any disclaimer, the term of this patent is extended or adjusted under 35 U.S.C. 154(b) by 269 days.

(21) Appl. No.: 12/720,176

(22) Filed: Mar. 9, 2010

(65) Prior Publication Data

US 2010/0231072 A1   Sep. 16, 2010

(30) Foreign Application Priority Data

Mar. 10, 2009 (CN) .......................... 2009 1 0105950
Oct. 19, 2009 (CN) .......................... 2009 1 0110542

(51) Int. Cl.
*H02K 21/26* (2006.01)
(52) U.S. Cl. .............................. 310/154.21; 310/154.08
(58) Field of Classification Search ............. 310/154.21, 310/154.08
See application file for complete search history.

(56) References Cited

U.S. PATENT DOCUMENTS

| 4,453,097 | A | * | 6/1984 | Lordo ....................... 310/154.07 |
| 5,201,111 | A | * | 4/1993 | Prohaska ......................... 29/596 |
| 6,995,488 | B1 | * | 2/2006 | Yamashita et al. ........ 310/154.21 |
| 7,427,817 | B2 | | 9/2008 | Uenishi et al. |
| 7,498,706 | B2 | | 3/2009 | Kuroda |
| 7,528,515 | B2 | | 5/2009 | Kuroda |
| 2004/0061406 | A1 | * | 4/2004 | Yokota et al. ................. 310/216 |
| 2007/0007838 | A1 | * | 1/2007 | Kuroda .................... 310/154.21 |

FOREIGN PATENT DOCUMENTS

| EP | 2157677 A1 | 2/2010 |
| EP | 2157678 A1 | 2/2010 |

* cited by examiner

*Primary Examiner* — Thanh Lam
(74) *Attorney, Agent, or Firm* — Muncy, Geissler, Olds & Lowe, PLLC

(57) ABSTRACT

A window lift has a motor and a gearbox. The motor is a permanent magnet motor, comprising a stator and a rotor rotatably mounted to the stator. The stator or the rotor comprises a housing and magnets fixed to inner surface of the housing. The radial cross section of the housing comprises n side portions and n connecting portions, where n is an integer greater than 2. Adjacent side portions are connected together by one corresponding connecting portion and the magnets are fixed at portions corresponding to the connecting portions. The radial cross section of each side portion is like a convex curve line, which is curved outwardly relative to a straight line passing through the two ends of the convex curve line.

19 Claims, 6 Drawing Sheets

US 8,274,189 B2

MOTOR AND WINDOW LIFT

CROSS REFERENCE TO RELATED APPLICATIONS

This non-provisional patent application claims priority under 35 U.S.C. §119(a) from Patent Application No. 200910105950.X filed in The People's Republic of China on Mar. 10, 2009, and Patent Application No. 200910110542.3 filed in The People's Republic of China on Oct. 19, 2009.

FIELD OF THE INVENTION

This invention relates to a motor with permanent magnets, and also relates to a window lift which comprises the permanent motor and a gearbox driven by the motor.

BACKGROUND OF THE INVENTION

FIG. 12 illustrates a radial cross section of a traditional permanent magnet direct current (PMDC) motor 30. The PMDC motor comprises a stator and a rotor rotatably mounted to the stator. The stator comprises a housing 20 which comprises two flat side portions 22 and two curved connecting portions 24. The stator also comprises two magnets 26, which are fixed onto the inner surface of the two curved connecting portions, respectively. The rotor has a rotor core 28 confronting the two magnets 26.

There is a desire for a smaller motor having an equal or increased performance. In other words, there is a desire for a motor having higher power density. There are two ways to increase a motor's performance, one being to increase the number of magnet poles, the other being to increase the outer diameter of rotor core. However, both of these two methods will usually result in an increased motor size. In some applications, motor size is a very critical factor. For example, a window lift, which comprises a motor and a gearbox driven by the motor, is usually installed in a limited space formed by two parallel side walls of a car door, and a special motor size and motor shape is required. For example, referring to FIG. 12, the diameter D2 between the two flat side portions 22 should not larger than a predetermined size, since the distance between the two side walls of a car door is limited. Whereas the diameter D1 may be larger as it extends in a direction between the wall panels of the door.

SUMMARY OF THE INVENTION

Hence there is a desire for a motor having a higher power density.

This is achieved in the present invention by making a motor housing with a special shape.

Accordingly, in one aspect thereof, the present invention provides a permanent magnet motor, comprising a stator and a rotor rotatably mounted to the stator, one of the stator and the rotor comprising a housing and at least one magnet providing magnetic poles fixed to an inner surface of the housing, a radial cross section of the housing comprising n side portions and n connecting portions, where n is an integer greater than 2, adjacent side portions being connected together by one corresponding connecting portion, and the magnetic poles being located at locations corresponding to the connecting portions, wherein the radial cross section of each side portion is like a convex curve line, which is curved outwardly with respect to a straight line passing through the two ends of the convex curve line.

Preferably, the housing and the at least one magnet are parts of the stator, and the rotor comprises a rotor core confronting the magnetic poles.

Preferably, the convex curve line can be cut by a straight line at a maximum of two points.

Preferably, the radial cross section of each said side portion is like an arc, the circle center of which is offset from the axis of rotation of the rotor.

Alternatively, the radial cross section of each side portion comprises two curve line segments connected together by a straight line segment.

Alternatively, the radial cross section of each side portion comprises a curve line segment and two straight line segments which are connected together by the curve line segment.

Preferably, the radial cross section of each connecting portion is like an arc, the circumferential length of each connecting portion being smaller than the circumferential length of each side portion.

Alternatively, the radial cross section of each connecting portion is like a straight line segment.

Preferably, n is equal to 3, 4, 6 or 8.

Optionally, the at least one magnet may be a single piece ring magnet, the radial thickness of the ring magnet at portions corresponding to the connecting portions of the housing being greater than the radial thickness of the ring magnet at portions corresponding to the side portions of the housing. Alternatively, the at least one magnet is a number of discrete magnet pieces, one per magnetic pole, fixed to the housing at locations corresponding to respective connecting portions.

According to a second aspect, the present invention provides a window lift comprising a gearbox and a motor which is constructed according to the first aspect of the present invention.

By implementing the present invention, a motor will have a compact structure and have an equal or increased performance.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
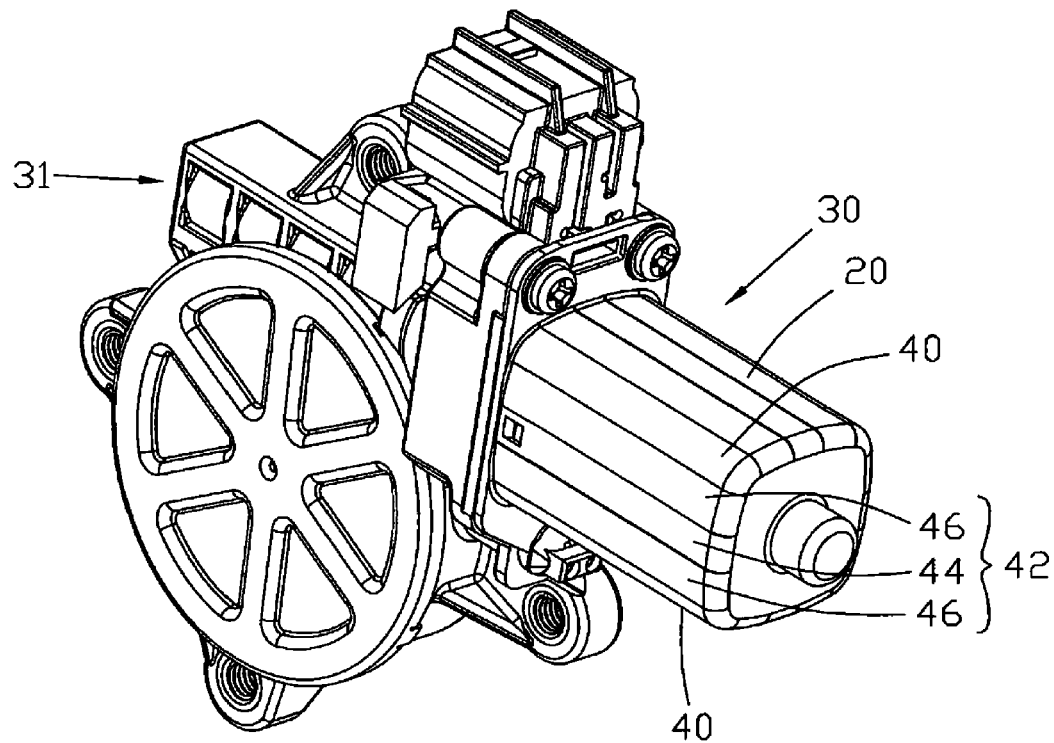
FIG. 1 is a block diagram illustrating a window lift according to a preferred embodiment of the present invention.
Figure 2:
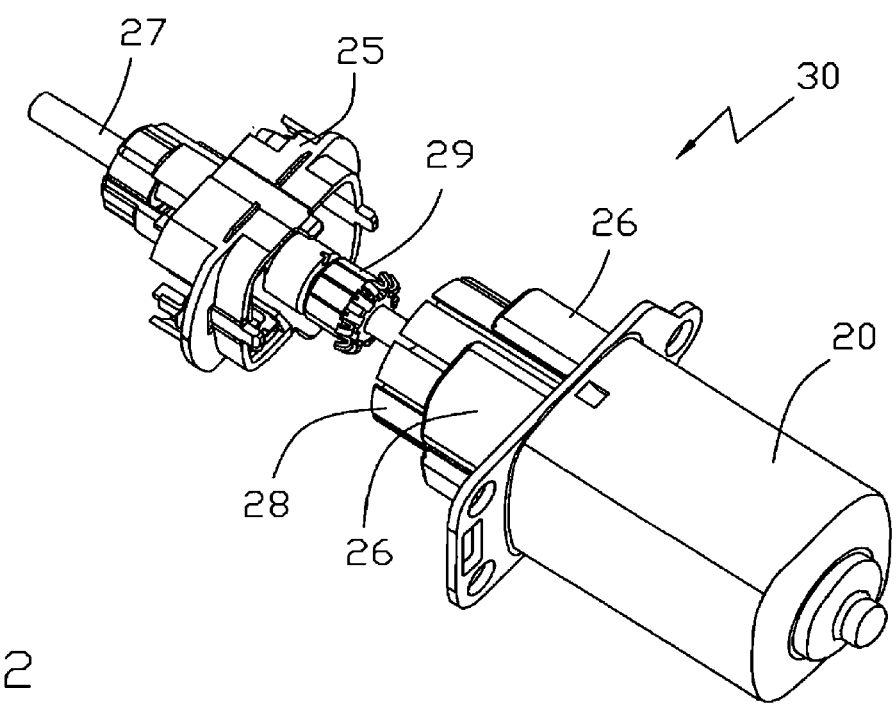
FIG. 2 illustrates a PMDC motor, which is a part of the block diagram of FIG. 1.

FIG. 1 illustrates a window lift according to a preferred embodiment of the present invention. The window lift comprises a PMDC motor 30 and a gearbox 31 driven by the motor 30. FIG. 2 illustrates the PMDC motor in a partially exploded form. The motor comprises a stator and rotor. The stator comprises a housing 20 and magnets 26 fixed onto an inner surface of the housing. The rotor comprises a rotor shaft 27, a rotor core 28 and a commutator 29 fixed onto the shaft 27. Windings (not shown) are wound about the rotor core and terminated on the commutator. The rotor is rotatably mounted to the stator with the rotor core 28 confronting the magnets 26. A worm (not shown) is fixed onto an end of the shaft 27 to drive a worm gear (not shown) inside the gearbox 20. An end cap 25 closes an open end of the housing and supports brush gear (not shown).

Figure 3:
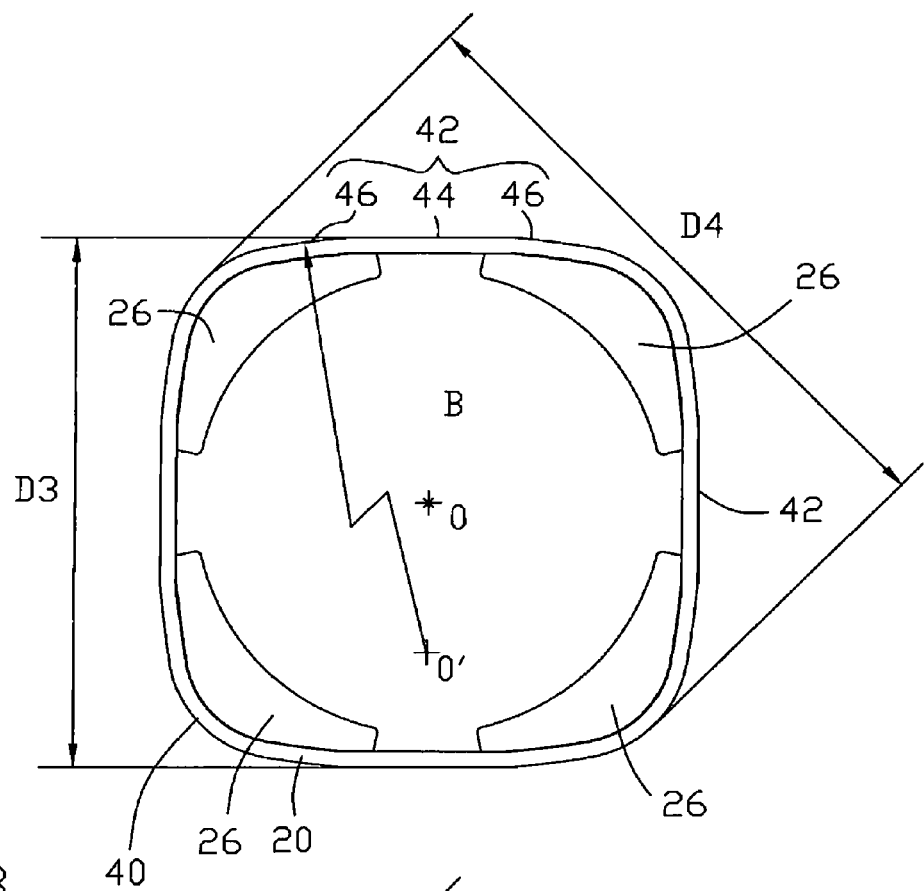
FIG. 3 illustrates a radial cross section of a stator of the PMDC motor of FIG. 2.

FIG. 3 illustrates a radial cross section of the stator of the PMDC motor 30 of FIG. 2. The stator comprises a housing and four magnets 26 fixed onto the inner surface of the housing 20. The housing comprises four connecting portions 40 and four side portions 42, with adjacent side portions 42 being connected together by one of the connecting portions 40. Each magnet 26 is fixed to a corresponding connecting portion 40. Preferably, the radial cross section of each connecting portion 40 is like an arc, curving about a corresponding axis. The radial cross section of each side portion 42 is like a convex curve line, which is curved outwardly relative to a straight line passing through the two ends of the convex curve line. In the present specification and Claims, the phrase "convex curve line" may be an arc segment, or may comprise more than one arc segment or more than one straight line segment, or a combination thereof. In the present embodiment, the radial cross section of each side portion 42 comprises a straight line segment 44 and two arc segments 46 which are connected together by the straight line segment 44. The circle center O' of the arc segments 46 is offset from the rotational center O of the rotor. Circle center of each of the connecting portions 40 can coincide with or be offset from the rotational center O. The rotational center O lines on the axis of the shaft about which the rotor rotates. The circle center O' is the center of the circle of which the arc is a part. The two arcs which make up the arc portions 46 of a single side portion 42 may be parts of the same circle.

Compared to a traditional two pole, round motor, the PMDC motor according to the preferred embodiment of the present invention will have a higher performance since the stator has more magnetic poles (four poles), and has a more compact structure since the magnets are fixed at portions corresponding to the connecting portions. Therefore, the motor according to the present invention will have a higher power density. In addition, it is easier to measure outer diameter D3 at portions corresponding to two opposite side portions 42 since each of the side portions comprises a straight line segment 44. More importantly, by making the middle portion of the side portion flat, the dimension of the motor measured across the side portions may be made smaller without adversely affecting the performance of the motor as this portion is located between the magnets.

Figure 4:
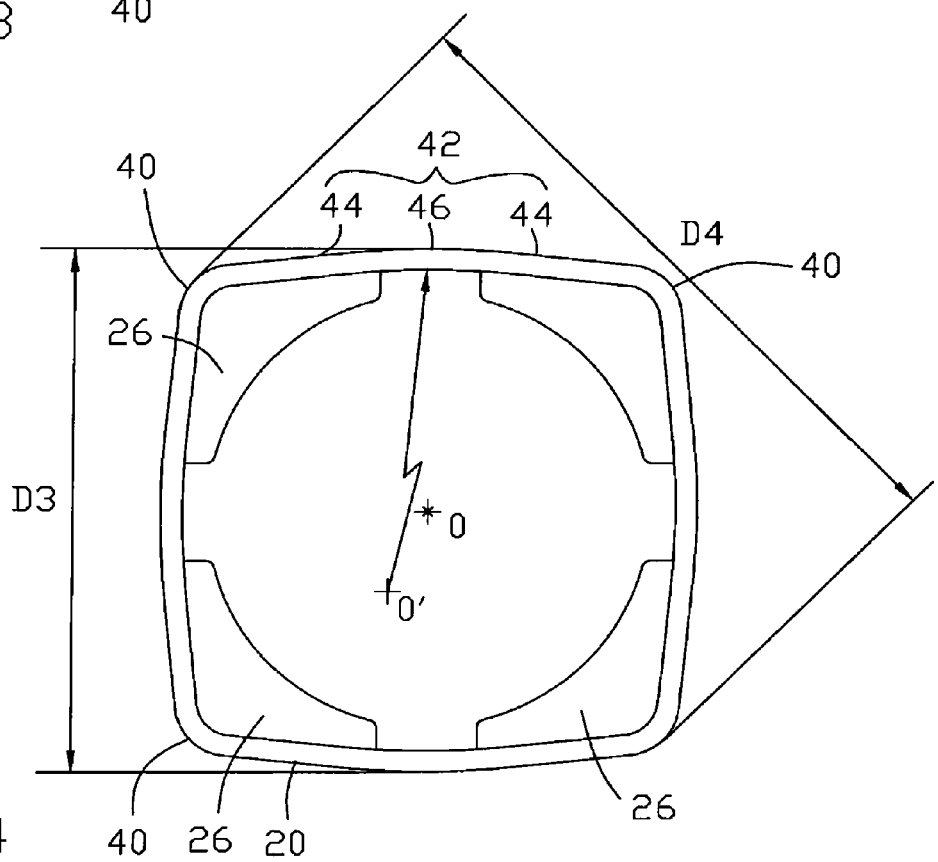
FIG. 4 illustrates a radial cross section of a stator of a PMDC motor according to a second embodiment of the present invention.

FIG. 4 illustrates a radial cross section of a stator of a PMDC motor according to second preferred embodiment of the present invention. The motor also comprises a housing 20 which comprises four connecting portions 40 and four side portions 42. In this embodiment, the radial cross section of each connecting portion 40 is like an arc, and the radial cross section of each side portion 42 is a convex curve line comprising an arc segment 46 and two straight line segments 44. The two straight line segments 44 are connected together by the arc segment 46. Preferably, the circle center O' of each arc segment 46 is offset from the rotational center O of the rotor, and the circle center of each connecting portion 40 coincides with the rotational center. The magnets 26 are fixed to the inner surface of the connecting portions 40 and the inner surface of corresponding straight line segments 44 of side portions 42. The straight line segments 44 of the side portions make it easier to fix the magnets.

Figure 5:
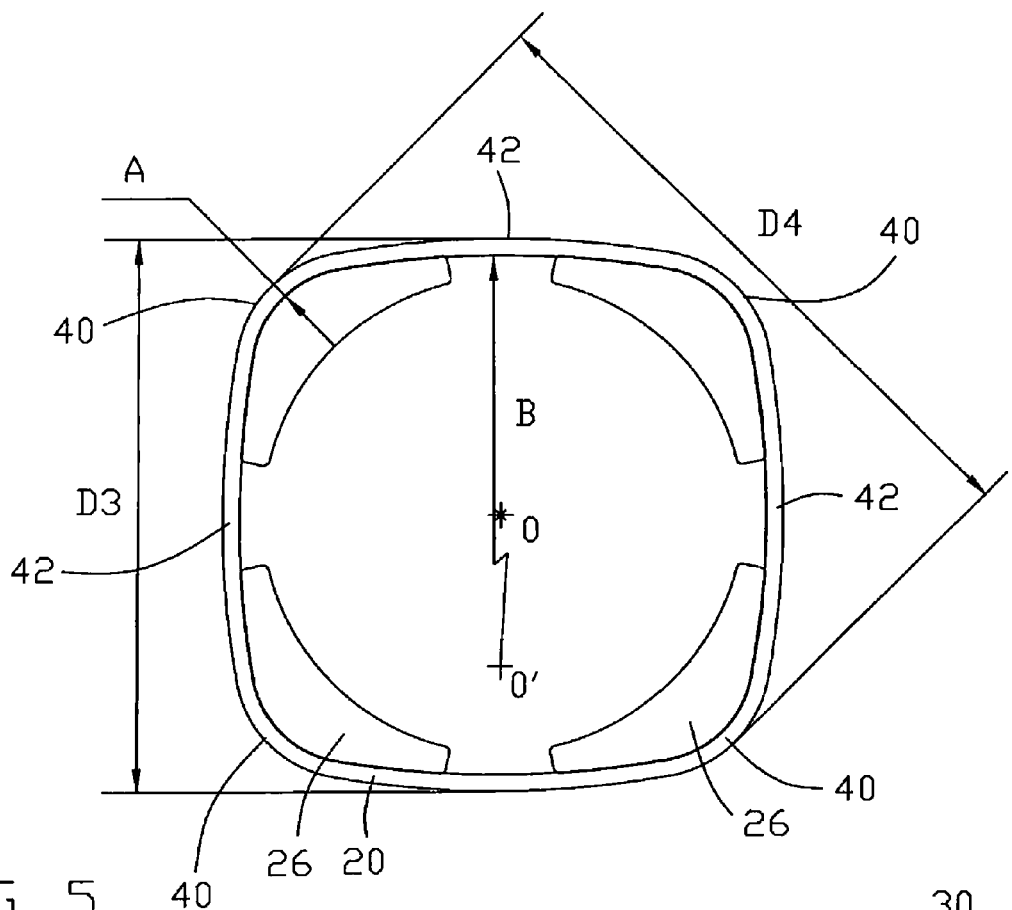
FIG. 5 illustrates a radial cross section of a stator of a PMDC motor according to a third embodiment of the present invention.
Figure 12:
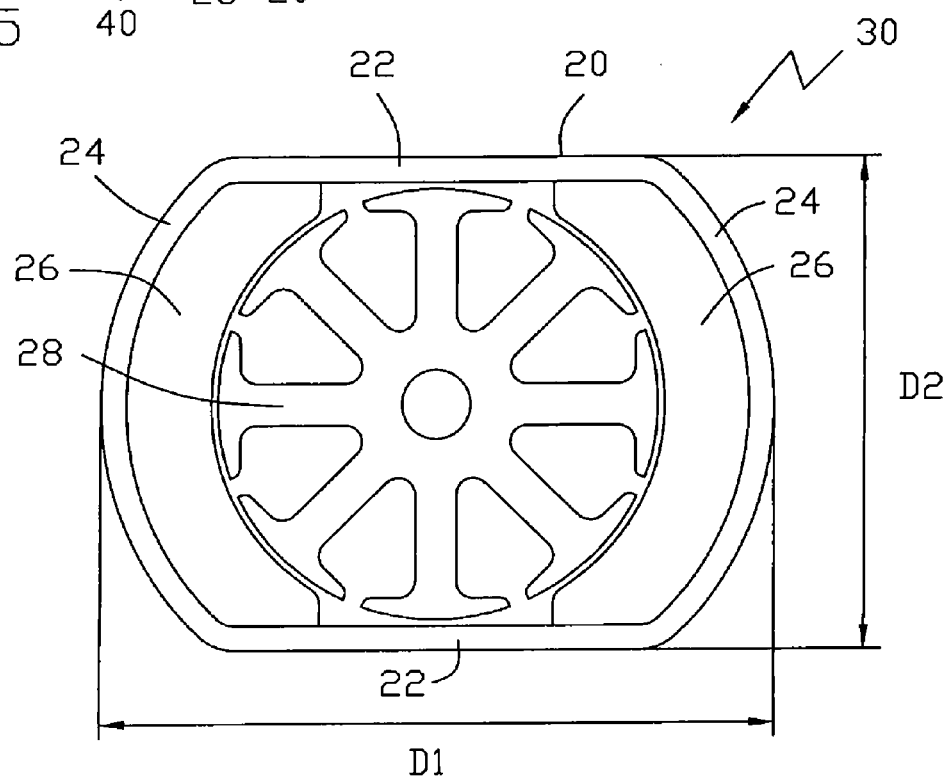
FIG. 12 illustrates a radial cross section of a traditional flat sided motor.

FIG. 5 illustrates a radial cross section of a stator of a PMDC motor according to a third preferred embodiment of the present invention. The stator comprises a housing 20 which comprises four side portions 42 and four connecting portions 40, adjacent side portions 42 being connected by a corresponding one of the connecting portions 40. The radial cross section of each side portion 42 is like a convex curve line which can be cut by a straight line at a maximum of two points. Preferably, the convex curve line is an arc having a circle center O' which is offset from the rotational center O of the rotor. The radial cross section of each connecting portion 40 is also like an arc. The circumferential length of each connecting portion 40 is smaller than the circumferential length of each side portion 42. The radius of the arc corresponding to each connecting portion 40 is smaller than the radius of the arc corresponding to each side portion 42. For example, the radius A is smaller than the radius B, and preferably the ratio of radius A to radius B is 1%~80%. In this preferred embodiment, the radius B is larger than the radius of the rotor core.

The outer diameter D4 measured between two diagonally opposite connecting portions 40 is the motor's largest outer diameter, and the outer diameter D3 measured between two opposite side portions 42 is the motor's smallest outer diameter. The magnets 26 are fixed to the housing 20 at portions corresponding to the largest outer diameter, so that interior space of the housing is used effectively. As is known, an air gap is formed between the magnets 26 and the rotor core to allow the rotor to rotate. The radial thickness of the air gap may be even or uneven.

Figure 6:
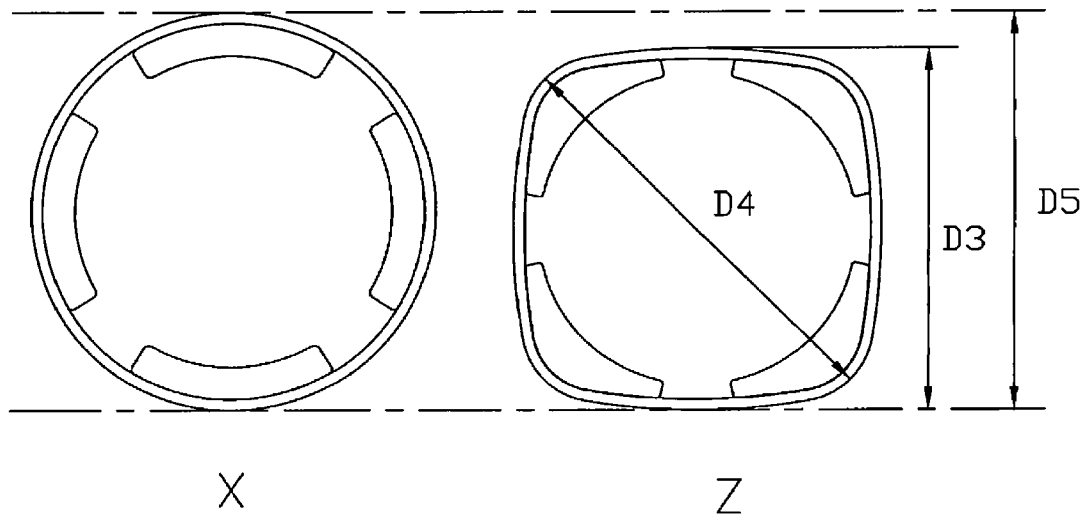
FIG. 6 illustrates radial cross sections of a stator of a PMDC motor Z according to the present invention and a stator of a traditional round motor X.

FIG. 6 illustrates radial cross sections of a stator of a traditional round motor X and a stator of a motor Z according to a preferred embodiment of the present invention. Performance of the motor X and the motor Z is approximately the same, as the minimum diameter between the magnets is the same. The largest outer diameter D4 of the motor Z is approximately equal to outer diameter D5 of the motor X. The smallest diameter D3 of the motor Z is smaller than the outer diameter D5. In other words, the size of the motor Z is smaller than the size of the motor X. Compared with the traditional round motor X, a motor according to the present invention will have a smaller size and thus a higher power density.

Figure 7:
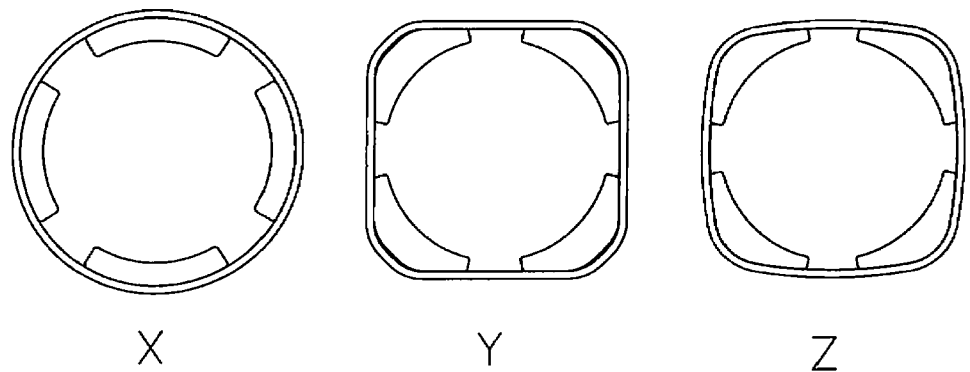
FIG. 7 illustrates radial cross sections of stators of a motor X, a motor Y and a motor Z, wherein motor X is a traditional round motor, motor Y is a flat motor, and motor Z is a motor according to a preferred embodiment of the present invention.

FIG. 7 illustrates radial cross sections of a stator of a traditional round motor X, a stator of a flat motor Y, and a stator of a motor Z according to a preferred embodiment of the present invention. Stator housing of the motor Y comprises four flat side portions and four connecting portions with magnets fitted to the housing at locations corresponding to the connecting portions. In a finite element analysis (FEA)

test, exciting forces were imposed on the stator housing of each motor at portions where the magnets are fixed. Testing results of the three motors are illustrated in FIG. 8 and FIG. 9.

Figure 8:
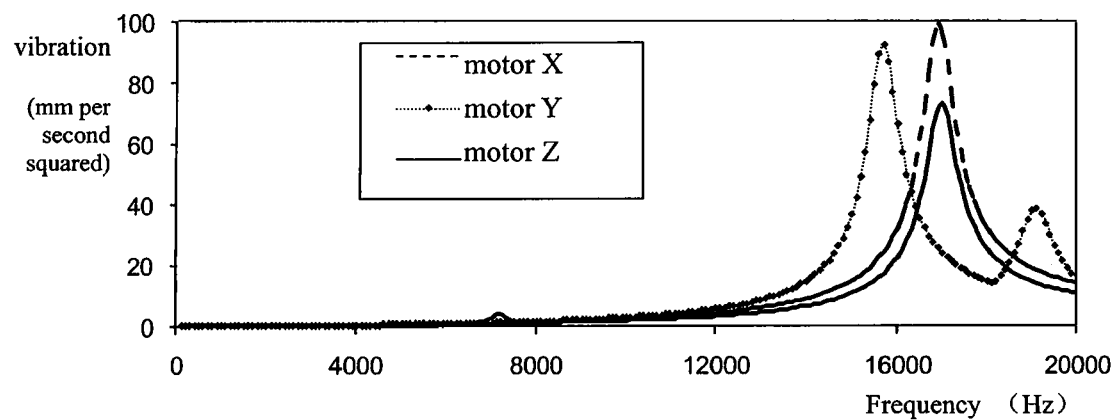
FIG. 8 illustrates testing results of motor X, motor Y and motor Z from a finite element analysis (FEA) test in a range of 0 to 20,000 Hz.

FIG. 8 illustrates the FEA testing results in a range of 0 to 20,000 Hz, wherein the horizontal coordinate represents frequency in Hz, and the vertical coordinate represents amplitude of vibration in mm per second squared. According to the testing results, the motor Z has a smaller vibration amplitude and less noise.

Figure 9:
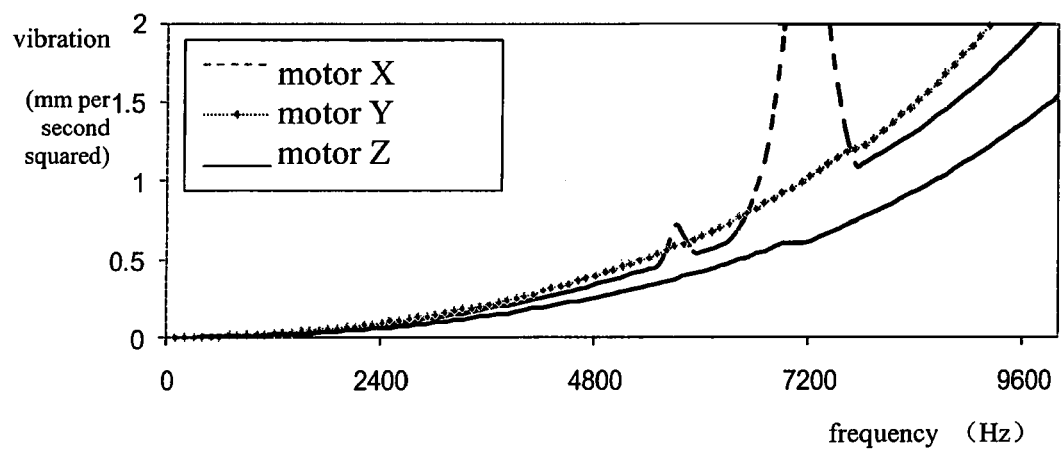
FIG. 9 illustrates testing results of motor X, motor Y and motor Z from a FEA test in a range of 0 to 10,000 Hz.

FIG. 9 illustrates the FEA testing results in a range of 0 to 10,000 Hz. According to the testing result, under these conditions the motor Z also has a smaller vibration amplitude and less noise.

Figure 10:
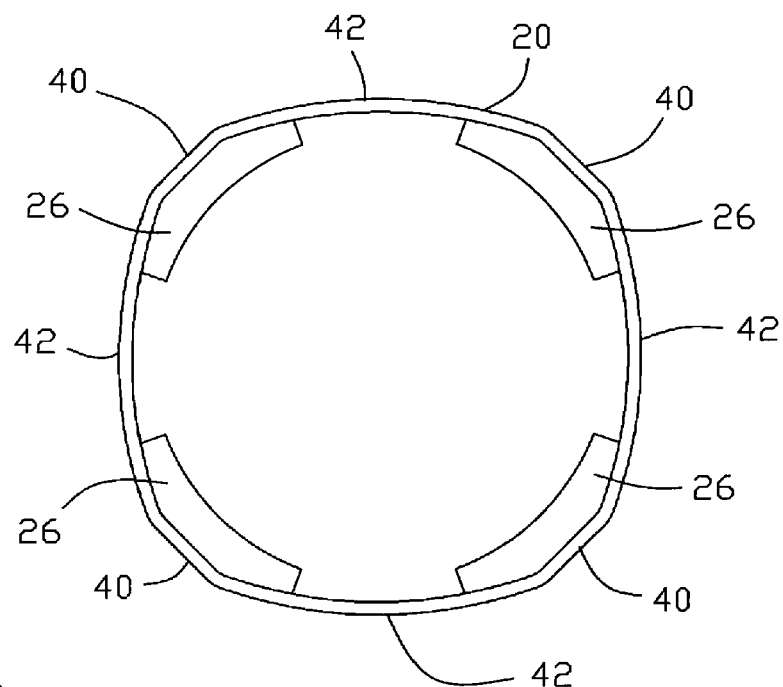
FIG. 10 illustrates a radial cross section of a stator of a PMDC motor according to a fifth embodiment of the present invention.

FIG. 10 illustrates a radial cross section of a stator housing 20 of a motor according to a fourth embodiment of the present invention. The housing 20 comprises four convex curve side portions 42 and four flat connecting portions 40. The radial cross section of each side portion 42 is a convex curve line which can be cut by a straight line at a maximum of two points, and the radial cross section of each connecting portion 40 is a straight line segment. Magnets 26 are fixed to the housing at portions corresponding to the connecting portions 40.

Figure 11:
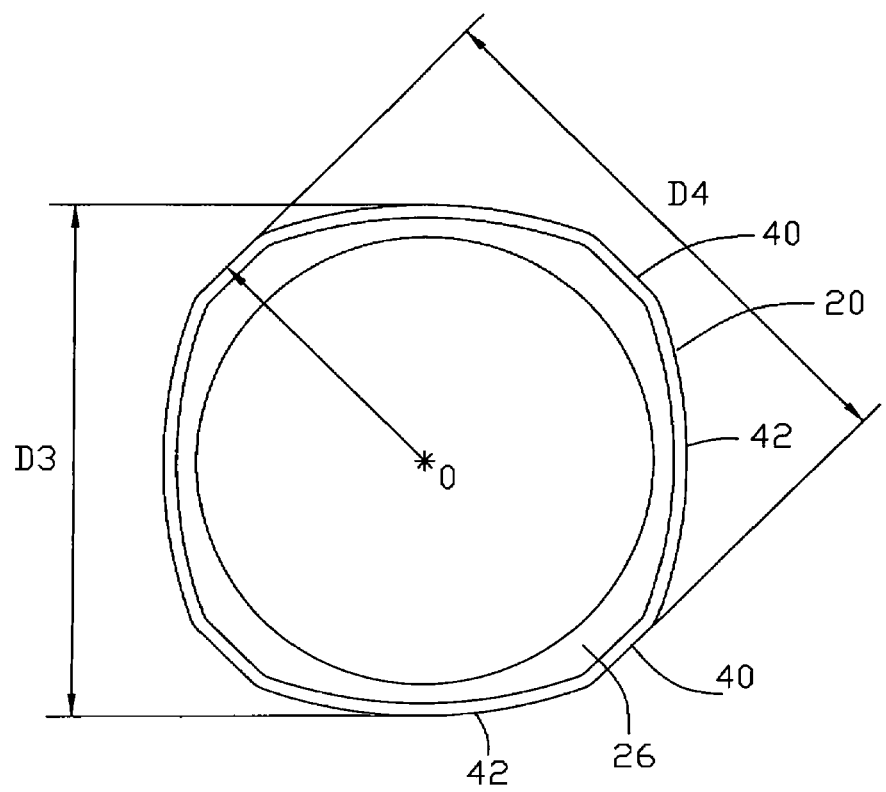
FIG. 11 illustrates a radial cross section of a stator of a PMDC motor according a sixth embodiment of the present invention.

FIG. 11 illustrates a radial cross section of a stator of a motor according to a fifth embodiment of the present invention. In this embodiment, the stator comprises a housing 20 and a magnet 26 fixed inside the housing 20. The magnet is a single piece ring magnet providing a number of magnetic poles. The radial thickness of the ring magnet 26 at portions corresponding to the connecting portions 40 of the housing 20 is greater than the radial thickness of the ring magnet 26 at portions corresponding to the side portions 42 of the stator housing. Four magnetic poles are formed by the ring magnet 26. Each of the magnetic poles are located at a location corresponding to one of the connecting portions 40 of the housing. In this embodiment, it is easy to fix the magnet 26 since it is a single piece magnet. In this embodiment, the connecting portions 40 are shown as being arc segments with a circle center at 0, the rotational center of the rotor.

Certain embodiments mentioned above related to motors whose stator housing comprises four side portions and four magnets. However, motors according to the present invention may comprise more than four or less than four side portions/magnets, such as three side portions, six side portions, eight side portions, etc. In addition, the housing and the magnets may be parts of the rotor, rather than being parts of the stator.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A permanent magnet motor, comprising a stator and a rotor rotatably mounted to the stator, one of the stator and the rotor comprising a housing and at least one magnet providing magnetic poles fixed to an inner surface of the housing, a radial cross section of the housing comprising n side portions and n connecting portions, where n is an integer greater than 2, adjacent side portions being connected together by one corresponding connecting portion, and the magnetic poles being located at locations corresponding to the connecting portions, wherein each of two circumferential ends of the radial cross section of each side portion has a curvature different from that of the radial cross section of each connection portion, and the radial cross section of each side portion is like a convex curve line, which is curved outwardly with respect to a straight line passing through the two circumferential ends of the convex curve line.

2. The motor of claim 1, wherein the housing and the at least one magnet are parts of the stator, and the rotor comprises a rotor core confronting the magnetic poles.

3. The motor of claim 1, wherein the convex curve line is arced as a portion of a circle.

4. The motor of claim 1, wherein the radial cross section of each said side portion is like an arc, the circle center of which is offset from the axis of rotation of the rotor.

5. The motor of claim 1, wherein the radial cross section of each side portion comprises two curve line segments connected together by a straight line segment.

6. The motor of claim 1, wherein the radial cross section of each side portion comprises a curve line segment and two straight line segments which are connected together by the curve line segment.

7. The motor of claim 1, wherein the radial cross section of each connecting portion is like an arc, the circumferential length of each connecting portion being smaller than the circumferential length of each side portion.

8. The motor of claim 1, wherein the radial cross section of each connecting portion is like a straight line segment.

9. The motor of claim 1, wherein n is equal to 3, 4, 6 or 8.

10. The motor of claim 1, wherein the at least one magnet is a single piece ring magnet, the radial thickness of the ring magnet at portions corresponding to the connecting portions of the housing being greater than the radial thickness of the ring magnet at portions corresponding to the side portions of the housing.

11. A window lift, comprising the permanent magnet motor of claim 1 and a gearbox driven by the motor.

12. A permanent magnet motor, comprising a stator and a rotor rotatably mounted to the stator, one of the stator and the rotor comprising a housing and at least one magnet providing magnetic poles fixed to an inner surface of the housing, a radial cross section of the housing comprising n side portions and n connecting portions, where n is an integer greater than 2, adjacent side portions being connected together by one corresponding connecting portion, and the magnetic poles being located at locations corresponding to the connecting portions, wherein each of the connecting portions has a constant curvature, and each of two circumferential ends of the side portion has a curvature different from that of the connecting portion, each side portion is like a convex curve line, which is curved outwardly with respect to a straight line passing through the two ends of the convex curve line.

13. The motor of claim 12, wherein each side portion comprises at least one curve line segment, which is arced as a portion of a circle.

14. The motor of claim 13, wherein each side portion is formed as a curve line segment.

15. The motor of claim 14, wherein the circle center of each side portion is offset from the axis of rotation of the rotor.

16. The motor of claim 13, wherein each side portion comprises two curve line segments connected together by a straight line segment.

17. The motor of claim 13, wherein each side portion comprises a curve line segment and two straight line segments which are connected together by the curve line segment.

18. The motor of claim 12, wherein each connecting portion is like an arc, the circumferential length of each connecting portion being smaller than the circumferential length of each side portion.

19. The motor of claim 12, wherein each connecting portion is like a straight line segment.

* * * * *